(12) United States Patent
Son

(10) Patent No.: US 8,416,367 B2
(45) Date of Patent: Apr. 9, 2013

(54) LIQUID CRYSTAL DISPLAY MODULE WITHOUT BOTTOM COVER

(75) Inventor: Nam Do Son, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 559 days.

(21) Appl. No.: 11/476,088

(22) Filed: Jun. 28, 2006

(65) Prior Publication Data

US 2007/0139577 A1   Jun. 21, 2007

(30) Foreign Application Priority Data

Dec. 19, 2005  (KR) ........................ 10-2005-0125319

(51) Int. Cl.
*G02F 1/1333* (2006.01)
*G02F 1/1335* (2006.01)
*F21V 7/04* (2006.01)

(52) U.S. Cl. .............. 349/67; 349/60; 349/65; 362/609; 362/632

(58) Field of Classification Search ............ 349/58, 349/60, 62, 65, 67, 113, 192; 362/608, 609; 362/632–634
See application file for complete search history.

(56) References Cited

U.S. PATENT DOCUMENTS

| 6,181,071 | B1* | 1/2001 | Yuuki et al. | 315/169.3 |
|---|---|---|---|---|
| 6,295,105 | B1* | 9/2001 | Lee et al. | 349/65 |
| 6,435,685 | B2* | 8/2002 | Matsushita | 362/608 |
| 6,452,649 | B1* | 9/2002 | Ono et al. | 349/61 |
| 6,490,016 | B1* | 12/2002 | Koura | 349/58 |
| 6,556,258 | B1 | 4/2003 | Yoshida et al. | |
| 6,690,435 | B1 | 2/2004 | Ha et al. | |
| 6,853,410 | B2* | 2/2005 | Matsuda et al. | 349/67 |
| 6,962,430 | B2* | 11/2005 | Ito et al. | 362/634 |
| 7,056,002 | B2* | 6/2006 | Kang et al. | 362/561 |
| 7,259,810 | B2* | 8/2007 | Kim | 349/67 |
| 7,834,955 | B2* | 11/2010 | Suzuki et al. | 349/67 |
| 2004/0062057 | A1 | 4/2004 | Ha et al. | |
| 2004/0169785 | A1 | 9/2004 | You et al. | |
| 2004/0189887 | A1 | 9/2004 | You et al. | |
| 2004/0218113 | A1 | 11/2004 | You | |
| 2005/0007626 | A1 | 1/2005 | Takaiwa | |
| 2005/0018104 | A1* | 1/2005 | Lee et al. | 349/65 |
| 2005/0068470 | A1 | 3/2005 | Won | |
| 2005/0146650 | A1 | 7/2005 | Chung et al. | |
| 2005/0243573 | A1 | 11/2005 | Kim et al. | |

FOREIGN PATENT DOCUMENTS

| CN | 1534335 | 10/2004 |
|---|---|---|
| CN | 1549026 | 11/2004 |
| CN | 1693954 | 11/2005 |
| JP | 11-329043 | 11/1999 |
| JP | 2001-125073 | 5/2001 |
| KR | 2000-0050379 | 5/2000 |

\* cited by examiner

*Primary Examiner* — Bumsuk Won
*Assistant Examiner* — Paisley L Arendt
(74) *Attorney, Agent, or Firm* — Morgan, Lewis & Bockius LLP

(57) ABSTRACT

A liquid crystal display module includes a liquid crystal display panel to display an image; a back light unit to irradiate light onto the liquid crystal display panel includes a luminescent lamp to emit light, a light guide panel to convert light emitted from the luminescent lamp into plane light and to emit the plane light, a lamp housing to fix the luminescent lamp to the light guide panel, the lamp housing condenses the light generated from the luminescent lamp, a reflection plate formed on the rear surface of the light guide panel to reflect light, and optical sheets formed on the front surface of the light guide panel; a main support to receive the liquid crystal display panel and the back light unit; and a reinforcing member formed on the rear surface of the light guide panel and overlapping the lamp housing and the reflection plate.

7 Claims, 7 Drawing Sheets

LIQUID CRYSTAL DISPLAY MODULE WITHOUT BOTTOM COVER

This application claims the benefit of Korean Patent Application No. 2005-0125319, filed on Dec. 19, 2005, which is hereby incorporated by reference.

BACKGROUND OF THE INVENTION

1. Field of the Invention

The present invention relates to a liquid crystal display device, and more particularly, to a liquid crystal display module that provides reliable and efficient module assembly.

2. Discussion of the Related Art

A cathode ray tube (CRT) is often used in TVs and monitors as a measuring instrument and an information terminal. However, due to its weight and size, the CRT cannot meet the requirements of the current trend of thin profile and light weight. Since the CRT cannot satisfy the above requirements, the CRT is being replaced with a Liquid Crystal Display (LCD) device that uses an electric field optical effect, a Plasma Display Panel (PDP) device that uses discharge, and an Electro Luminescent Display (ELD) device that uses an electric field luminescent effect. Among these display devices, the LCD device has been extensively researched and developed.

The LCD device has several advantages including small size, a light weight, and low power consumption. The LCD device is often used now as a monitor for a laptop computer, a monitor for a desktop computer, and a large-sized display device. Accordingly, demand for the LCD device has continuously increased. Most LCD devices are light-receiving devices that display an image by adjusting the amount of light supplied from the outside. Thus, this type of LCD device requires a separate light source for irradiating light on an LCD panel ( i.e., a back light unit). Back light units are divided according to the positions of lamp units, into an edge-type back light unit and a right below-type back light unit.

An Electro Luminescence (EL), a Light Emitting Diode (LED), a Cold Cathode Fluorescent Lamp (CCFL), or a Hot Cathode Fluorescent Lamp (HCFL) is used as the light source in LCD devices. Particularly, the CCFL, which has a long lifespan, low power consumption, and a thin profile, is mainly used in a large-sized color TFT-LCD.

FIG. 1 is a schematic exploded perspective view of a related art liquid crystal display device. As shown in FIG. 1, the related art liquid crystal display device includes a liquid crystal display panel 30 displaying an image, a fluorescent lamp 31 generating light, a lamp housing 32 formed in a U shape for surrounding the fluorescent lamp 31, a diffusion sheet 35, a first prism sheet 37, a second prism sheet 36, a protection sheet 38, a light guide panel 33, and a reflection plate 34.

The related art liquid crystal display device further includes a main support 39 for receiving the liquid crystal display panel 30 and a back light unit . Here, the fluorescent lamp 31, the lamp housing 32, the diffusion sheet 35, the first prism sheet 37, the second prism sheet 36, the protection sheet 38, the light guide panel 33, and the reflection plate 34 form the back light unit. The back light unit serves as a light source for the liquid crystal display panel 30 by irradiating light onto a display region (A) of the liquid crystal display panel 30. Although not shown in the drawings, the display region (A) of the liquid crystal display panel 30 includes two transparent substrates. Each transparent substrate has a polarization plate attached to the outer surface thereof, and a liquid crystal layer is formed between the inner surfaces of the two transparent substrates. The related art liquid crystal display device further includes a driving circuit 40 for driving the display region (A).

The back light unit is operated by the following method. When the fluorescent lamp 31 installed at one end of the light guide panel 33 is turned on, light generated from the fluorescent lamp 31 is reflected by the lamp housing 32. Reflected light is transferred to the other end of the light guide panel 33 (opposite side to the fluorescent lamp 31) through the cross section of the light guide panel 33. Accordingly, the light is spread over the surface of the light guide panel 33, and the spread light is irradiated onto the display region (A) by the diffusion sheet 35.

In the above related art liquid crystal display device, TFTs formed on the liquid crystal display panel 30 control pixels according to the signal of the driving circuit. The pixels selectively pass the light irradiated onto the display region (A) to display an image on the display region (A) of the liquid crystal panel 30. Hereinafter, a related art liquid crystal display module will be described with references to FIGS. 2 and 3.

FIG. 2 is a perspective view of the related art liquid crystal display module, and FIG. 3 is a sectional view taken along the line II-II' of FIG. 2. As shown in FIGS. 2 and 3, the related art liquid crystal display module includes a main support 2, a back light unit 26 and a liquid crystal display panel 10 stacked next to the main support 2, a bottom cover 14 surrounding a first side surface and the bottom surface of the main support 2, and a top case 16 surrounding the edge of the liquid crystal display panel 10 and the side of the bottom cover 14.

Here, the main support 2 is a molded structure and has the stepped shape inner wall. The back light unit 26 is installed at the lowermost portion of the main support 2, and the liquid crystal display panel 10 is installed on the back light unit 26. The liquid crystal display panel 10 includes a lower substrate 10b on which TFTs are mounted, and an upper substrate 10a on which color filters are formed.

A liquid crystal is injected into a space between the lower substrate 10b and the upper substrate 10a. Polarization plates 22 and 24 are installed on the lower and upper surfaces of the liquid crystal display panel 10. The lower polarization plate 22 installed on the lower surface of the liquid crystal display panel 10 polarizes light supplied from the back light unit, then supplies the polarized light to the liquid crystal display panel 10. The upper polarization plate 24 installed on the upper surface of the liquid crystal display panel 10 polarizes light supplied from the liquid crystal display panel 10, and discharges the polarized light to the outside.

The bottom cover 14 surrounds the first side surface and the bottom surface of the main support 2. The top case 16 surrounds the upper portion and the portion of first side surface of the main support 2 to fix the main support 2 and the liquid crystal panel 10. The back light unit 26 includes a lamp housing 18 on which a light source 20 is mounted, a light guide panel 6 for converting light incident from the light source 20 into surface light, optical sheets 12 attached to the front surface of the light guide panel 6 to increase the efficiency of light incident on the liquid crystal display panel 10, and a reflection plate 4 attached to the rear surface of the light guide panel 6 for reflecting the light emitted from the rear surface of the light guide panel 6 towards the liquid crystal panel 10.

The light source 20 supplies designated light to the light guide panel 6 in response to power supplied from an external power source. Here, light emitted from the light source 20 in the direction opposite to the light guide panel 6 is reflected by the lamp housing 18, and is incident upon the light guide panel 6. The light guide panel 6 uniformly distributes the light incident from the light source 20 thereupon throughout the light guide panel 6, thereby allowing the light to be uniformly incident on the liquid crystal display panel 10.

Furthermore, the reflection plate 4 reflects light emitted from the lower portion of the light guide panel 6, thus supplying the light to the liquid crystal panel 10. The optical sheets 12 include upper and lower diffusion sheets and upper and lower prism sheets. The optical sheets 12 scatter light incident from the light guide panel 6 thereupon so that the light is uniformly distributed to the overall surface of the liquid crystal panel 10. Moreover, the optical sheets 12 refract and concentrate the scattered light to increase surface brightness, and diffuse the light to increase a viewing angle.

To meet the current trends of thin profile and light weight, the LCD devices incorporating these features are developed. Specifically, a liquid crystal display device for a notebook computer is developed to provide enhanced portability. However, the above related art liquid crystal display module has several disadvantages.

The main support and the bottom cover are required in the related art LCD module, thus increasing the total number of steps for fabricating the related art liquid crystal display module. In addition, an overall fabrication time is increased. The bottom cover made of a metal increases the overall production cost. Furthermore, the related art LCD module fabrication processes include connecting the bottom cover and the main support by screw, hence lengthening the fabrication time. Moreover, since the bottom cover and the main support are screw-connected, the portions of the bottom cover and the main support connecting the two parts may wear out. In addition, the use of the bottom cover increases the overall weight and volume of the liquid crystal display module.

SUMMARY OF THE INVENTION

Accordingly, the present invention is directed to a liquid crystal display module that substantially obviates one or more of the problems due to limitations and disadvantages of the related art.

An object of the present invention is to provide a liquid crystal display module that eliminates the need for a bottom cover to improve production yield and by doing so to reduce the production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display module includes a liquid crystal display panel to display an image; a back light unit to irradiate light onto the liquid crystal display panel includes a luminescent lamp to emit light, a light guide panel to convert light emitted from the luminescent lamp into plane light and to emit the plane light, a lamp housing to fix the luminescent lamp to one side of the light guide panel, wherein the lamp housing condenses the light generated from the luminescent lamp, a reflection plate formed on the rear surface of the light guide panel to reflect light upwardly, and optical sheets formed on the front surface of the light guide panel; a main support to receive the liquid crystal display panel and the back light unit; and a reinforcing member formed on the rear surface of the light guide panel of the back light unit, and overlapping the lamp housing and the reflection plate.

In another aspect, the liquid crystal display module includes a liquid crystal display panel to display an image; a back light unit to irradiate light onto the liquid crystal display panel includes a luminescent lamp to emit light, a light guide panel to convert light emitted from the luminescent lamp into plane light and to emit the plane light, a reflection plate formed on the rear surface of the light guide panel to reflect light upwardly, a main support to receive the liquid crystal display panel, and a lamp housing to fix the luminescent lamp to one side of the light guide panel, wherein the lamp housing condenses the light generated from the luminescent lamp and overlaps a portion of the reflection plate; and optical sheets formed on the front surface of the light guide panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
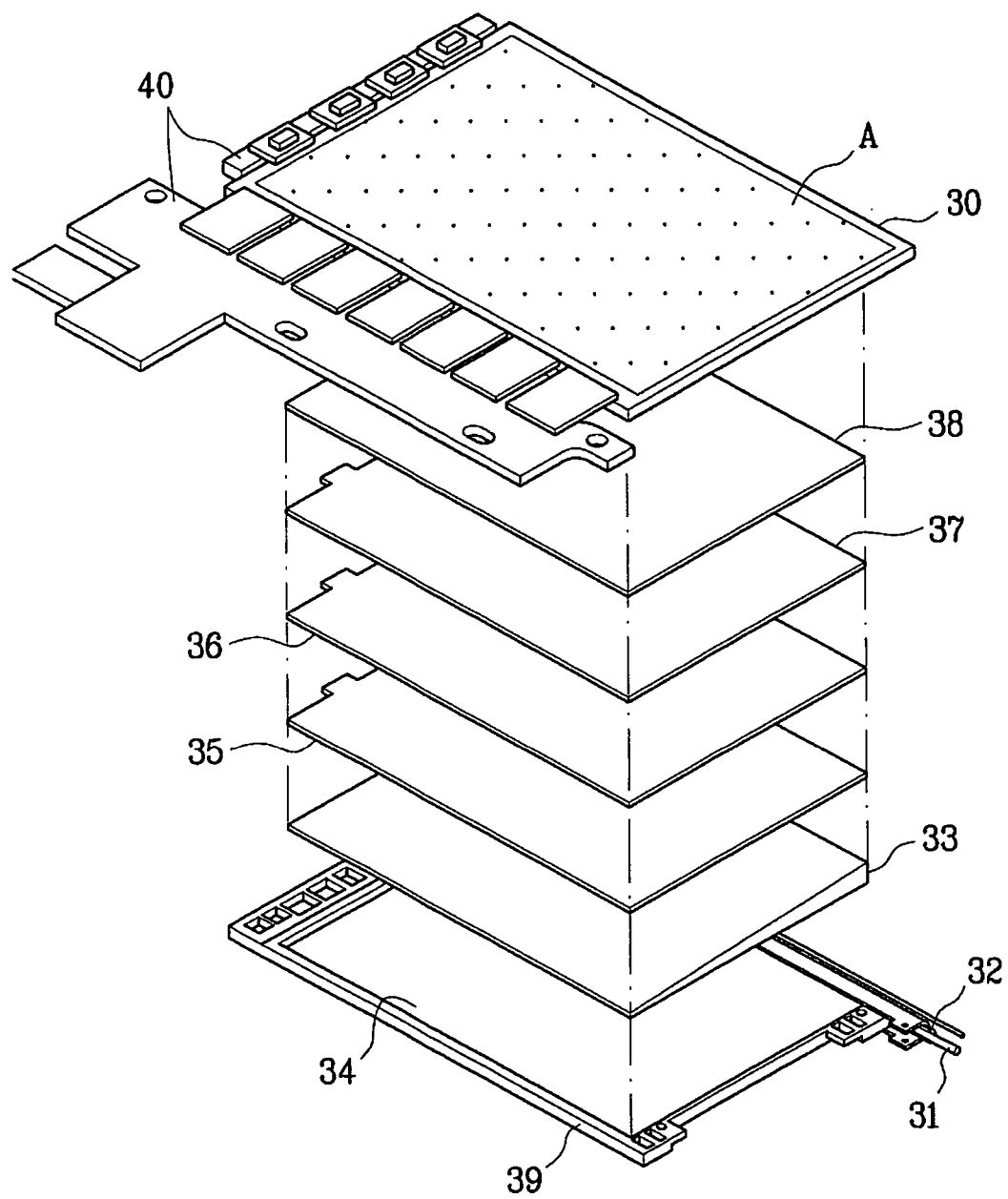
FIG. 1 is a schematic view of a related art liquid crystal display device.
Figure 2:
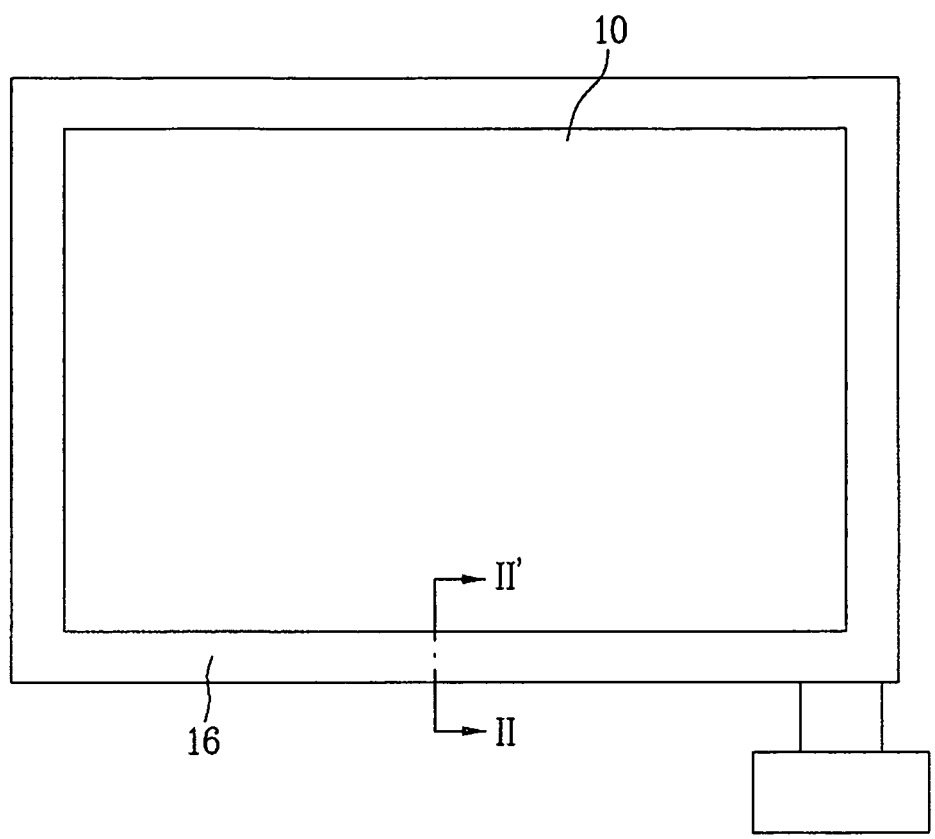
FIG. 2 is a perspective view of the related art liquid crystal display module.
Figure 3:
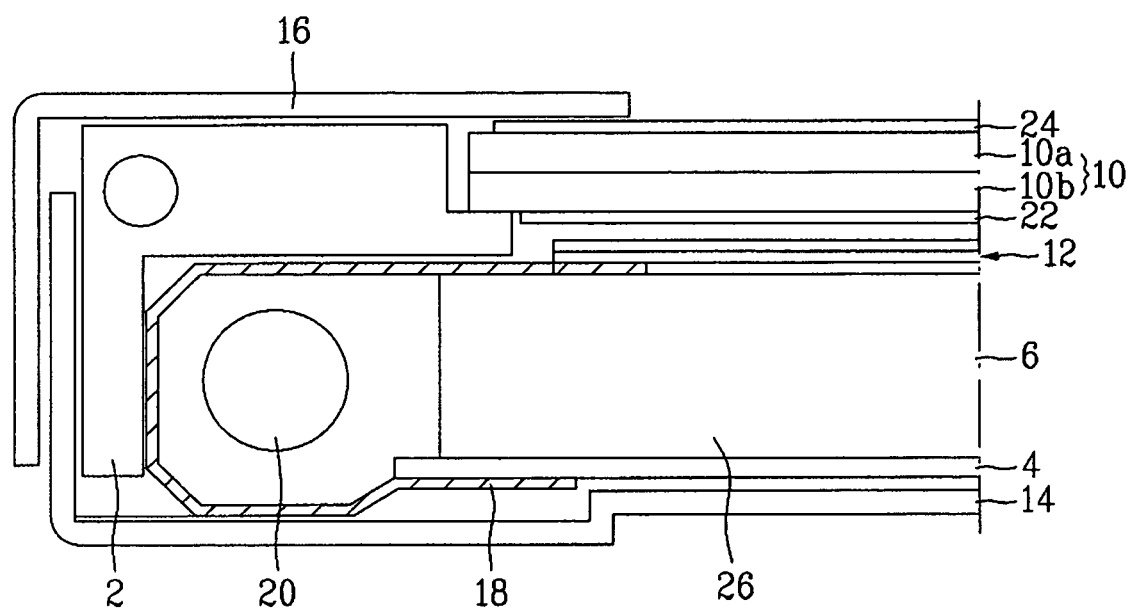
FIG. 3 is a sectional view taken along the line II-II' of FIG. 2.
Figure 4:
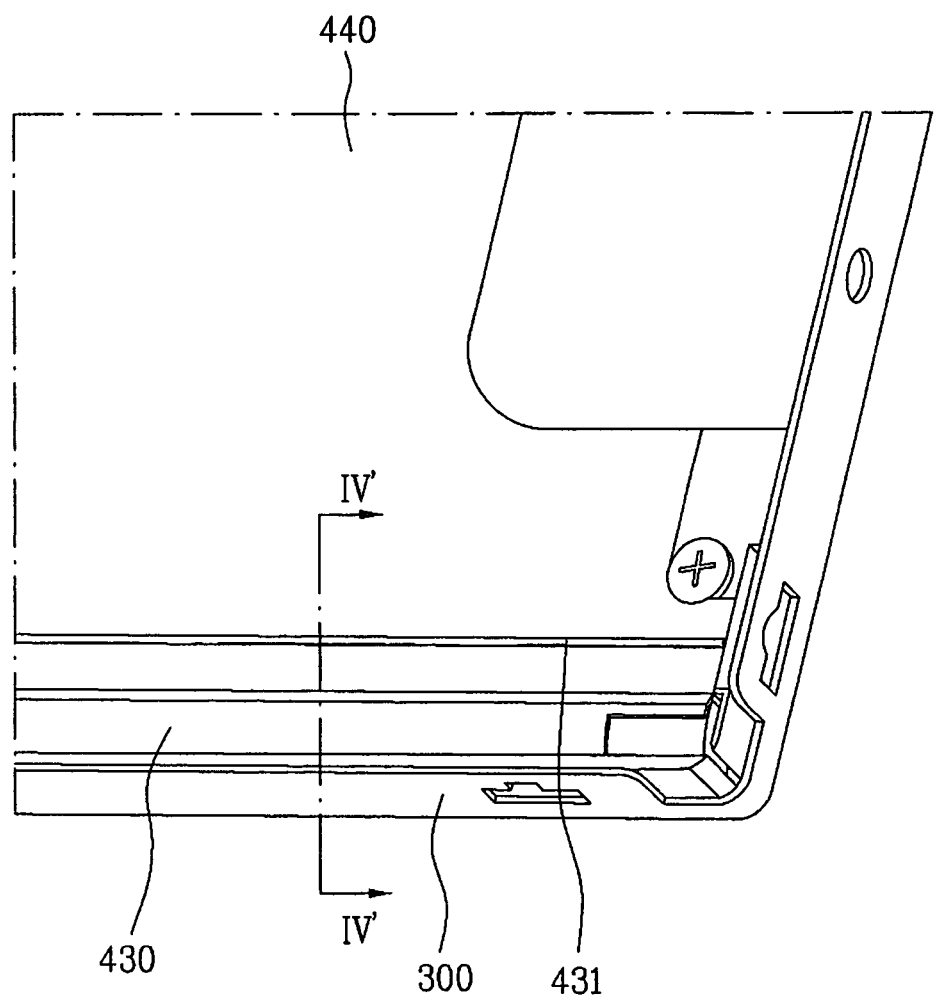
FIG. 4 is a rear view of a liquid crystal display module in accordance with a first exemplary embodiment of the present invention.
Figure 5:
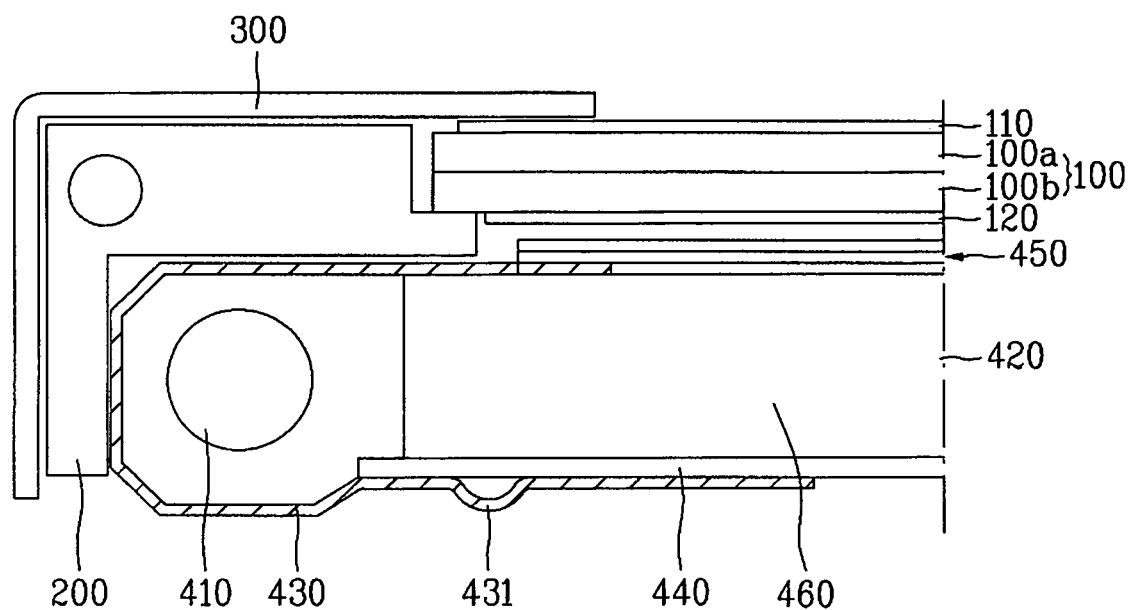
FIG. 5 is a sectional view taken along the line IV-IV' of FIG. 4.

FIG. 4 is a rear view of a liquid crystal display module in accordance with a first exemplary embodiment of the present invention, and FIG. 5 is a sectional view taken along the line IV-IV' of FIG. 4. A written description for the like elements having similar features may be omitted. Written descriptions of the functions for the like elements are omitted. As shown in FIGS. 4 and 5, the first exemplary liquid crystal display module includes a liquid crystal panel 100 displaying an image, a back light unit 460 irradiating light onto the liquid crystal display panel 100, a main support 200 for receiving the liquid crystal display panel 100 and the back light unit 460, and a top case 300 surrounding the edge of the liquid crystal display panel 100 and portions of side surfaces of the main support 200.

In the liquid crystal display panel 100, liquid crystal cells are arranged in an active matrix shape between upper and lower substrates 100a and 100b. TFTs for converting a video signals are installed in each of the liquid crystal cells. The video signals change the Refractivities of the liquid crystal cells, thereby displaying an image on the liquid crystal panel 100. A tape carrier package (not shown) having a driver IC (integrated circuit) for applying driving signals to the TFTs is attached to the lower substrate 100b of the liquid crystal display panel 100.

Polarization plates 110 and 120 are respectively installed on two surfaces of the liquid crystal display panel 100. Specifically, the polarization plate 110 is installed on the front surface of the upper substrate 100a and the polarization plate 120 is installed on the bottom surface of the lower substrate 100b. The polarization plates 110 and 120 serve to improve the viewing angle of the image displayed by the liquid crystal cells.

The back light unit 460 includes a lamp 410 receiving power from an external power source through a wire and irradiating light onto the liquid crystal display panel 100, a light guide panel 420 guiding light incident from the lamp to the liquid crystal panel 100, a lamp housing 430 surrounding the lamp 410 and body of the light guide panel 420, a reflection plate 440 disposed on the bottom surface of the light guide panel 420, and a plurality of optical sheets 450 to improve the transmittance efficiency of light emitted from the light guide panel 420 and irradiating the light onto the liquid crystal panel 100. The lamp housing 430 also functions to reflect light irradiated from the lamp 410 towards the guide panel 420, thereby minimizing the loss of light and increasing the efficiency of light.

In order to achieve light-weight and thin-profile requirements, the test module having no bottom cover is prepared. In the test module, the light guide panel 420 and the lamp 410 are supported only by the lamp housing 430. Accordingly, reduction of overall module thickness and weight is achieved. Thereafter, vibration test, impact test, and drop test are conducted to check the reliability of the test module. The result indicates that the lamp housing 430 does not absorb all the impact, and thus the lamp housing 430 may be deformed or the light guide panel 420 may be separated from the liquid crystal display panel. This generates other problems, such as leakage of light at the guide panel and darkening of the liquid crystal panel.

To solve the above problems, a beading portion 431 is additionally formed on the lamp housing 430, thereby reinforcing the strength of the lamp housing 430. The beading portion 431 is formed at a designated location where the lamp housing 430 and the reflection plate 440 overlap. A portion of the reflection plate 440 protrudes and the beading portion 431 surrounds this protruded portion. The light guide panel 420 guides light, which is incident from the lamp 410 thereupon at a designated tilt angle, to the liquid crystal display panel 100. The reflection plate 440 reflects the light generated from the lamp 410 towards the light guide panel 420 and prevents light loss.

The optical sheets 450 include upper and lower diffusion sheets and upper and lower prism sheets. The optical sheets 450 scatter light emitted from the light guide panel 420 so that the light is uniformly distributed to overall surface of the liquid crystal panel 100. The optical sheets 450 refract and concentrate the scattered light to increase surface brightness, and diffuse the light to increase a viewing angle. The top case 300 has a rectangular band structure including a flat portion and a side portion that bends perpendicularly from the flat portion. The top case 300 surrounds the edge of the liquid crystal display panel 100 and side surfaces of the main support 200.

Figure 6:
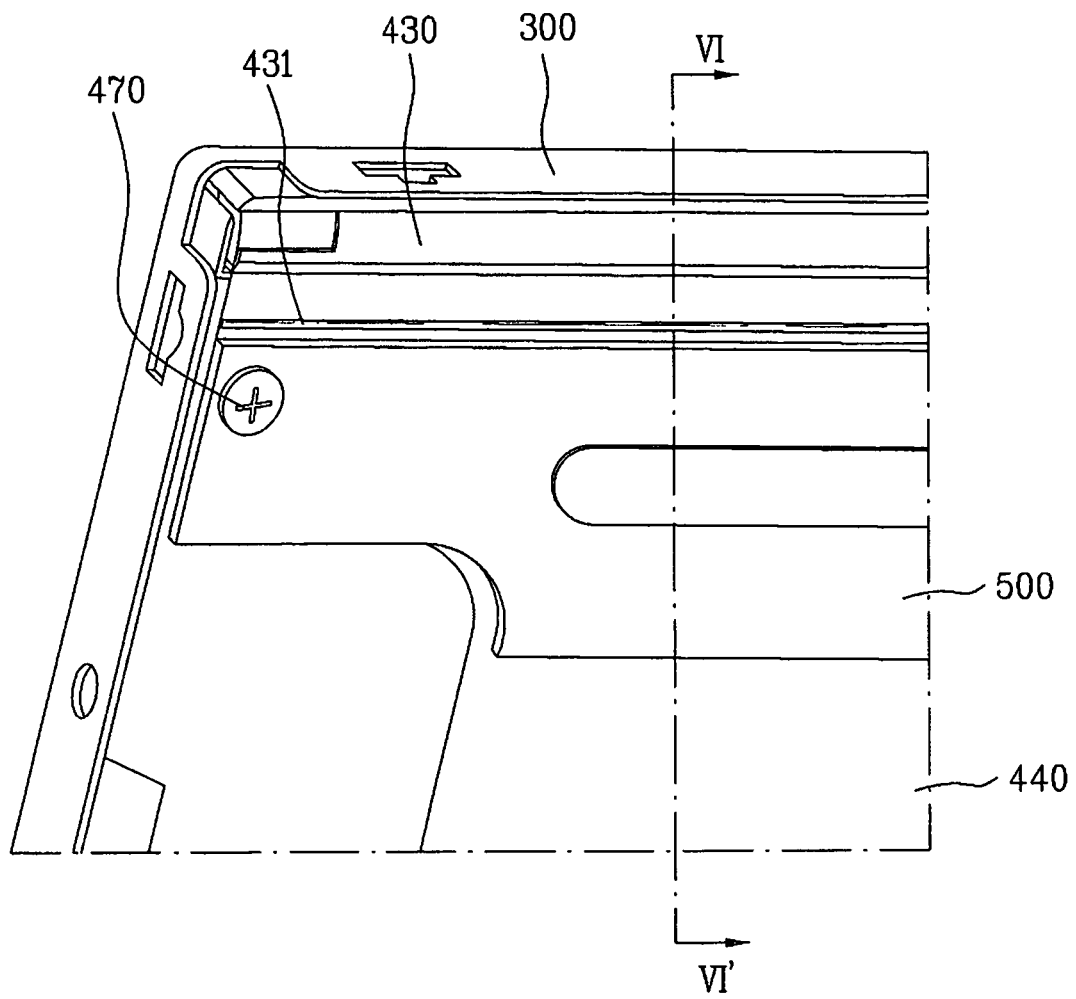
FIG. 6 is a rear view of a liquid crystal display module in accordance with a second exemplary embodiment of the present invention.
Figure 7:
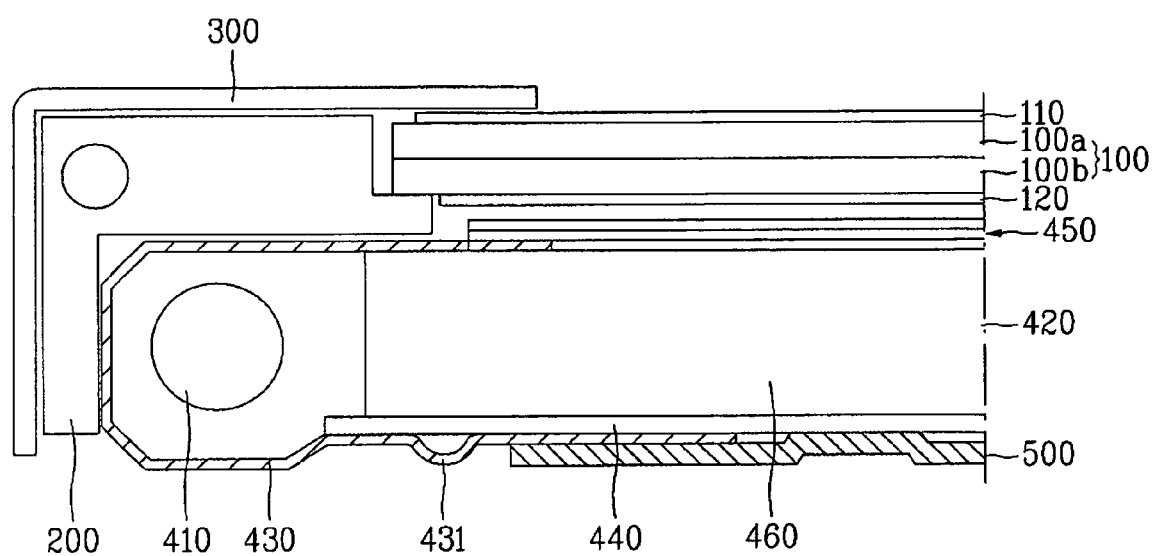
FIG. 7 is a sectional view taken along the line VI-VI' of FIG. 6.

FIG. 6 is a rear view of a liquid crystal display module in accordance with a second exemplary embodiment of the present invention, and FIG. 7 is a sectional view taken along the line VI-VI' of FIG. 6. The second exemplary liquid crystal display module is similar to the first exemplary liquid crystal display module except for a reinforcing member 500. The reinforcing member 500 prevents deformation of the lamp housing 430. Accordingly, the second exemplary liquid crystal display module includes two additional parts, the beading portion 431 and the reinforcing member 500 to strengthen the lamp housing 430.

As shown in FIGS. 6 and 7, to prevent the deformation of the lamp housing 430, the reinforcing member 500 that overlaps portion of lamp housing 430 and portion of reflection plate 440 is installed. The reinforcing member 500 is made of the same material as the lamp housing 430 (i.e., aluminum or alloy) and has a designated size. One portion of the reinforcing member 500 overlaps the end of the lamp housing 430, and the other portion of the reinforcing member 500 is attached to the reflection plate 440 so that light does not leak to the outside.

As shown in FIG. 7, a portion of lamp housing 430 protrudes outwardly directly below the lamp 410. The height of beading portion 431, and the thickness of the lamp housing 430 and the reinforcing member 500 fit within the height of this protruded portion. Thus, even if the reinforcing member 500 is attached to the lamp housing 430, the overall thickness of the liquid crystal display module is not increased.

To increase a level of adhesiveness between the lamp housing 430 and the reinforcing member 500, the reinforcing member 500 is attached to the lamp housing 430 using a double-sided adhesive tape. A beading portion may be additionally formed on the reinforcing member 500 to additionally improve the strength of the reinforcing member 500. The reinforcing member 500 is fixed to the lamp housing 430 using a screw 470. A screw hole is formed through the portion of the reinforcing member 500 where it overlaps the lamp housing 430. The reinforcing member 500 is fixed to the lamp housing 430 by tightening the screw 470 through the screw hole. Furthermore, the reinforcing member 500 and the main support 200 may be fixed, or the reinforcing member 500, the lamp housing 430, and the main support 200 may be simultaneously connected using the screw 470.

As described above, the exemplary liquid crystal display module of the present invention has several advantages. First, the liquid crystal display module omits the use of a bottom cover, thereby reducing the overall thickness and the weight. In addition, this omission simplifies the module assembly process. Second, since a reinforcing member is attached to a lamp housing to strengthen the lamp housing, it is possible to prevent the deformation of the lamp housing so that light leakage is prevented. Third, the use of the reinforcing member improves the reliability of the liquid crystal display module.

It will be apparent to those skilled in the art that various modifications and variations can be made in the liquid crystal display module of the present invention without departing from the spirit or scope of the inventions. Thus, it is intended that the present invention cover the modifications and variations of this invention provided they come within the scope of the appended claims and their equivalents.

What is claimed is:
1. A liquid crystal display module, comprising:
a liquid crystal display panel to display an image;

a back light unit to irradiate light onto the liquid crystal display panel including a luminescent lamp to emit light, a light guide panel to convert light emitted from the luminescent lamp into plane light and to emit the plane light, a lamp housing to fix the luminescent lamp to one side of the light guide panel, wherein the lamp housing condenses the light generated from the luminescent lamp, a reflection plate separate from the lamp housing and formed on a rear surface of the light guide panel to reflect light upwardly, and optical sheets formed on a front surface of the light guide panel;

a main support to receive the liquid crystal display panel and the back light unit;

a reinforcing member formed on the rear surface of the light guide panel of the back light unit, and overlapping the lamp housing and the reflection plate, to prevent a deformation of the lamp housing; and a beading portion that is a concave portion of the lamp housing and formed to prevent a deformation of the lamp housing and to receive a protruded portion of the reflection plate at a location where the liquid crystal display panel, the light guide panel and the reflection plate overlap to reinforce a strength of the lamp housing;

wherein the reinforcing member is fixed to the lamp housing using a screw or a double-sided adhesive tape.

2. The liquid crystal display module as set forth in claim 1, wherein the reinforcing member is made of a same material as the lamp housing.

3. The liquid crystal display module as set forth in claim 1, wherein the reinforcing member is fixed to the main support using a screw.

4. The liquid crystal display module as set forth in claim 1, wherein the reinforcing member is made of aluminum or alloy.

5. The liquid crystal display module as set forth in claim 1, wherein the reinforcing member is formed large enough to overlap the lamp housing and the reflection plate.

6. A liquid crystal display module, comprising:

a liquid crystal display panel to display an image;

a back light unit to irradiate light onto the liquid crystal display panel including a luminescent lamp to emit light, a light guide panel to convert light emitted from the luminescent lamp into plane light and to emit the plane light, a reflection plate formed on a rear surface of the light guide panel to reflect light upwardly, and a lamp housing separate from the reflection plate to fix the luminescent lamp to one side of the light guide panel, wherein the lamp housing condenses the light generated from the luminescent lamp and overlaps a portion of the reflection plate;

a main support to receive the liquid crystal display panel and the back light unit;

optical sheets formed on a front surface of the light guide panel; and a beading portion that is a concave portion of the lamp housing and formed to prevent a deformation of the lamp housing and to receive a protruded portion of the reflection plate at a location where the liquid crystal display panel, the light guide panel and the reflection plate overlap to reinforce a strength of the lamp housing.

7. The liquid crystal display module as set forth in claim 6, wherein the lamp housing is fixed to the main support using a screw.

* * * * *